(No Model.)

M. D. PECKHAM & C. E. SWAN.
WASHER FOR VEHICLE AXLES.

No. 529,831. Patented Nov. 27, 1894.

Witnesses:

Inventors:
Malcolm D. Peckham
Charles E. Swan

UNITED STATES PATENT OFFICE.

MALCOLM D. PECKHAM, OF NEW YORK, AND CHARLES E. SWAN, OF ROME, ASSIGNORS TO THE COLUMBIA WASHER COMPANY, OF NEW YORK, N. Y.

WASHER FOR VEHICLE-AXLES.

SPECIFICATION forming part of Letters Patent No. 529,831, dated November 27, 1894.

Application filed February 19, 1894. Serial No. 500,616. (No model.)

*To all whom it may concern:*

Be it known that we, MALCOLM D. PECKHAM, of New York, in the county of New York, and CHARLES E. SWAN, of Rome, Oneida county, State of New York, citizens of the United States, have invented certain new and useful Improvements in Washers, of which the following is a specification.

Our invention relates to elastic washers intended particularly for the axle-bearings of vehicle wheels; and the objects of the invention are to devise a washer that may be cheaply constructed, the parts of which shall be capable of being readily assembled, which shall possess effective wearing qualities, shall be elastic sufficiently to adapt itself to spaces of varying depths and that shall contain an elastic packing in contact with the axle around which the washer may be placed capable of absorbing and retaining lubricating oil, without being injuriously affected by such oil, and of giving up and supplying to said axle such oil. The elastic packing may also project slightly beyond the outer circumference of the metallic rings as this may be found desirable in some cases, especially where the washer when in place on the axle is within a box to which the lubricating oil is supplied, as the lubricant will thus be more readily taken up by the packing.

Primarily the invention consists in combining with two metallic rings, of the requisite thickness, a packing ring of felt, or other like substance, which after having been manufactured in the form of sheets may readily be cut up into the proper shape, capable of absorbing oil from, and releasing it onto the axle under the lateral pressure exerted by the thrust of the wheel, making the packing ring project inwardly, and also outwardly beyond the edges of the metallic rings and providing suitable connecting devices between such rings. We do not however limit ourselves to the use of an oil absorbing and releasing substance for the packing ring as for some purposes any other kind of elastic substance may be made use of for the intermediate ring.

The invention further consists in making the rings of the washer in sections and hinging them together, and combining therewith details hereinafter described and indicated in the claims.

Figure 1:
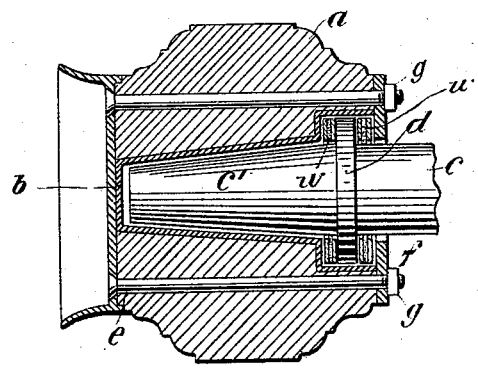
Figure 8:
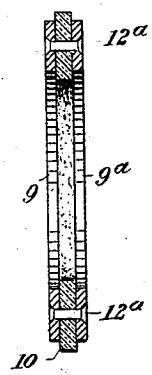
Figure 4:
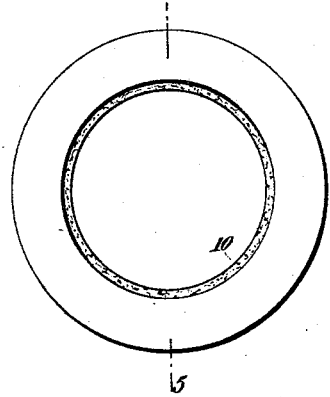
Figure 5:
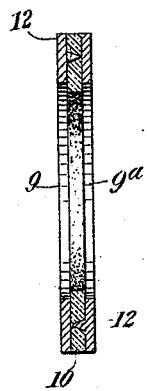
Figure 6:
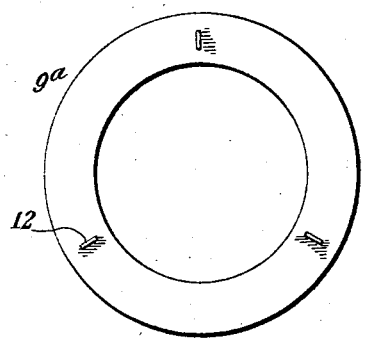
Figure 2:
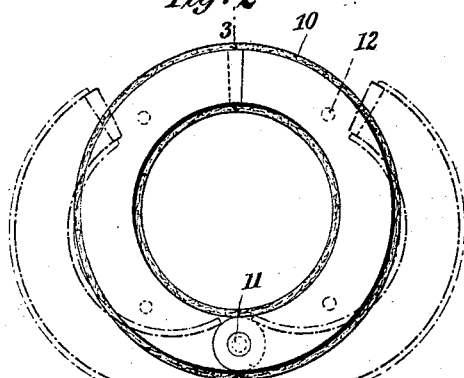
Figure 3:
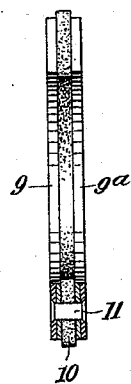
Figure 7:
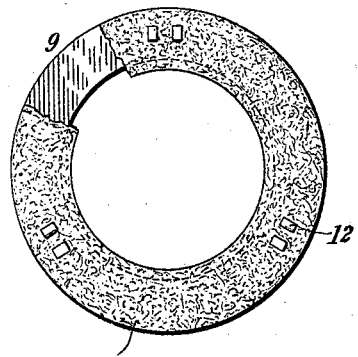

In the annexed drawings which form a part of this specification, and in which like parts are indicated by like letters and numerals of reference in the several views, Figure 1 is a longitudinal section of a hub of a carriage wheel and a side elevation of a portion of the axle which is fitted within the box of the hub, our improved washers, shown in section, being placed on each side of the shoulder of the axle within the box of the hub. Fig. 2 is a plan view of the washer showing the intermediate packing extended beyond the inner and outer circumferences of the metallic rings, the rings being made in sections and hinged together as shown. In this view the washer is shown open in dotted lines. Fig. 3 is a cross-section on the line 3 3 of Fig. 2. Fig. 4 is a plan view of our washer, the metallic rings being continuous and not hinged and the intermediate packing of felt, or the like, projecting beyond the inner circumference of the metallic rings. Fig. 5 is a cross-section on the line 5 5 of Fig. 4. Fig. 6 is a plan view of the inner face of one of the metallic rings of Fig. 5. Fig. 7 is also an inside plan view of one of the metallic rings provided with pairs of pins or burrs and also showing the packing or felt in place on the ring with the pins or burrs penetrating through it, and Fig. 8 is a cross sectional view of the complete washer, the metallic rings with the washer of felt, or the like, between them being permanently connected together by rivets with their ends countersunk in the faces of the rings. Fig. 1 is drawn on a smaller scale than the remaining figures.

Referring to the drawings, 9 and 9ª indicate two metallic companion rings, designed to form together with a ring 10, interposed between them, the elastic washer. Such ring 10 is made of an elastic substance and preferably of material such as felt, leather, asbestos, or the like, which in addition to being elastic is also capable of absorbing oil, holding it and under favorable circumstances releasing such oil. It is shown to be made of uniform thickness, and extends a little beyond the edges of the inner and outer circumferences of the metallic rings, as shown. The metallic rings 9, 9ª, as shown in Fig. 2, are made in sections which are so hinged together that when the sections are closed a complete circle is provided. The hinge is indicated at 11, and the ends of the sections that are adapted to come together to complete the ring are formed with one metallic portion of each section extended beyond its companion sectional portion, thus rendering the joint more stable when the hinged washer is closed around the axle. The sections of each of the two metallic rings abut against each other, thus making the two metallic rings as well as the packing ring of uniform thickness at the joint.

The object of making the metallic washer in sections, hinged together, is to permit the washer to be easily placed upon and removed from an axle in the rear of the usual shoulder on the axle. In Fig. 1 there is shown a mode of connecting the axle and wheel-hub now commonly employed. In this view $a$ is the hub of the wheel provided with a cavity into which is driven a metallic box $b$, adapted to receive the end $c'$ of the axle $c$, the interior of the box $b$ and the extremity $c'$ of the axle being correspondingly tapered as shown. On the axle $c$ there is formed a shoulder $d$ which is within box $b$ when the parts are assembled. The metallic washers are adapted to be placed on each side of the shoulder $d$. One rests against that face of the shoulder contiguous to the tapered portion $c'$ of the axle, and which is slipped on from the end of the axle before placing the latter in the box. The washer thus employed will be a continuous ring washer such as shown in Figs. 4 or 8. A continuous ring washer could not be placed on the axle in the rear of the shoulder $d$; a washer of the requisite size would have to be split and sprung into place; but a metallic washer such as we have devised could not be made sufficiently flexible to be utilized in that way.

By making the washer in sections, and permanently hinging the sections together in the manner shown, we may make use, in the position indicated, of a washer consisting of rigid metallic plates and an intermediate felt or analogous lining, with its accompanying advantages. When the washers, which are indicated by $w$ in Fig. 1, are in position on the axle the bolts $e$ which pass through openings in hub $a$ and holes in the plate $f$ are fixed in place by the nuts $g$, thus holding the plate $f$ firmly against the rear end of the hub and confining the washers $w$ in position within the box $b$ of the hub $a$. Lubricant is supplied to box $b$ in any usual way.

Each of the rings 9 and 9ª may be provided on that one of its faces which is designed to rest against the packing ring with projections shown in the drawings to be represented by a series of burrs or pins 12, 12. These burrs or pins are made with tapering sides so as to readily enter into the material forming the packing ring when the parts of the washer are being assembled and fitted together. There may be any desirable number of the burrs or pins, and they may be single projections, or double as shown in Fig. 7. The projections 12 are, however, not indispensable and in some cases will not be made use of.

The object of the burrs or pins 12 is to assist in holding the cushion 10 of felt, asbestos, or the like, between the metallic rings 9 9ª and to secure the several elements of the washer in operative relation when the washer is in use, and said pins or burrs effect this object by penetrating the cushion from both sides in several places. The burrs or pins 12 may be of such length as to penetrate only partly through the cushion 10, or they may be made to pass entirely through said cushion and their points flattened to secure the cushion in place. We prefer to have such pins or burrs made of lengths smaller than the thickness of the cushion interposed between the two metallic rings, so as not to be limited by their lengths as to the extent to which the elastic cushion between the rings may be compressed. The pins are preferably made integral with the metallic rings as shown in Figs. 4, 5 and 6 of the drawings. The thickness of the cushion 10 may vary according to the requirements of the services to which the washer is to be applied.

In some cases it may be found desirable to permanently secure the metallic rings and intermediate packing together, and this may be accomplished by rivets 12ª passing through the several rings, when assembled, near the outer edge of the washer, as shown in Fig. 8.

As one of the principle functions which this washer is to perform is to keep the wearing surfaces of the axle with which it comes in contact lubricated, it is necessary when having such object in view to make the inner cushion 10 of such material as will readily absorb lubricating oil previously applied to such axle and when the axle gets dry will again release such oil, thereby re-lubricating the axle; and for the same reason it is important to provide as large a contact surface between the axle and such cushion as may be consistent with a simple and cheap mode of constructing such washer. This we accomplish by making the inner wearing surface of the cushion of the full thickness of such cushion and dispensing with any flanges on the metallic rings 9, 9ª, where the same come in contact with the inner part of such cushion. We have shown both said metallic rings entirely flangeless, as this is the simplest and cheapest way of constructing the same, but do not wish to limit ourselves to such configuration of the same as it will readily be seen that particularly on the outer faces of the washer such flanges might be arranged without interfering with the proper functions of the washer as mentioned above. We consider it best to avoid the use of flanges on the two metallic rings which in the complete washer might come in contact with each other, thus guarding against the grinding action between such flanges, which action would take place after the washer had been in use a sufficient length of time to cause such flanges to abut against each other by the compression of the cushion and the consequent reduction of its thickness.

While any suitable mode of joining together the two metallic rings and securing between them the elastic cushion might be employed—in cases where such connecting means are considered desirable—we prefer the use of the pins or burrs 12 described, as they permit of properly assembling and joining together the parts forming the washer by simply pressing the same together, after first placing them in their proper relative positions. On the inner face of the ring in Fig. 6 we show single burrs while in corresponding positions on the face of the ring of Fig. 7 there are shown double burrs.

When the parts forming the washer are being assembled and pressed together the single burrs on one of the rings will be inserted between the double burrs of the other ring and with the aid of the packing material between said double burrs a locking action will be produced preventing any lateral movement of the metallic rings with reference to each other.

We do not wish to limit our invention to any particular manner of hinging the sections of the metallic rings together, nor to the form or number of pins or burrs formed on the inner faces of the metallic rings; nor do we confine ourselves to a construction embracing such pins or burrs as in some cases they may be omitted altogether.

Having thus described our invention, what we claim as new, and desire to secure by Letters Patent, is—

1. A washer consisting of two metallic rings made in sections and hinged together, and an elastic, sectional packing of felt or the like held between the sectional rings, one metallic portion of each section extending circumferentially beyond its companion sectional portion, substantially as set forth.

2. A washer consisting of two metallic rings made in sections and hinged together and a sectional, elastic packing of felt or the like held between the sectional rings, substantially as set forth.

3. In a washer, the combination with an elastic packing or cushion of elastic sheet fabric such as felt, or the like, capable of absorbing oil from and releasing the same onto the axle, of two metallic rings between which said packing is interposed, the said packing projecting slightly beyond the inner circumferences of the said metallic rings, substantially as set forth.

4. In a washer, the combination with an elastic packing or cushion of felt, or the like, capable of absorbing oil from and releasing the same onto the axle, of two metallic rings between which said packing is interposed, the said interposed packing projecting slightly beyond the inner and outer circumferences of the said metallic rings, substantially as set forth.

5. In a washer, the combination with an elastic packing or cushion made of sheet fabric and provided with a bearing surface to cooperate with an axle and capable of absorbing oil from and releasing the same onto the axle, of two metallic rings between which said packing is interposed and projections extending from the metallic rings into such sheet fabric for securing the several parts of the washer together, substantially as set forth.

6. In a washer, the combination with an elastic packing or cushion capable of absorbing oil and of releasing the same, and provided with a proper bearing surface, of two rings between which such cushion is interposed, and isolated projections attached to the surfaces of the rings facing each other and having free ends extending into such cushion, for the purpose of holding together the packing and the rings, substantially as set forth.

7. In an elastic washer, the combination of two metallic rings, an elastic layer of felt, leather, asbestos, or the like, of uniform thickness, interposed between such rings, its bearing surface extending slightly beyond the inner circumferences of the rings, and isolated projections on the rings extending into such interior layer and made integral with such rings, substantially as set forth.

8. In an elastic washer, the combination with two flangeless metallic rings provided with burrs or pins integral therewith on their respective inner faces, of an elastic cushion of felt, leather, asbestos or the like, held between said flangeless rings by the penetrating burrs or pins, substantially as set forth.

9. In an elastic washer, the combination with two metallic rings provided with burrs or pins integral therewith on their respective inner faces, of an elastic cushion of felt, leather, asbestos, or the like, held between said rings by the penetrating burrs or pins, said rings being provided with proper bearing surfaces, their respective inner faces adjoining the bearing surfaces being flangeless, substantially as set forth.

Signed at New York, in the county of New York and State of New York, this 13th day of February, A. D. 1894.

MALCOLM D. PECKHAM.
CHARLES E. SWAN.

Witnesses:
J. E. M. BOWEN,
M. C. PINCKNEY.